March 12, 1946. F. G. LOGAN 2,396,379
ELECTRIC CONTROLLING APPARATUS
Filed May 25, 1944 2 Sheets-Sheet 1
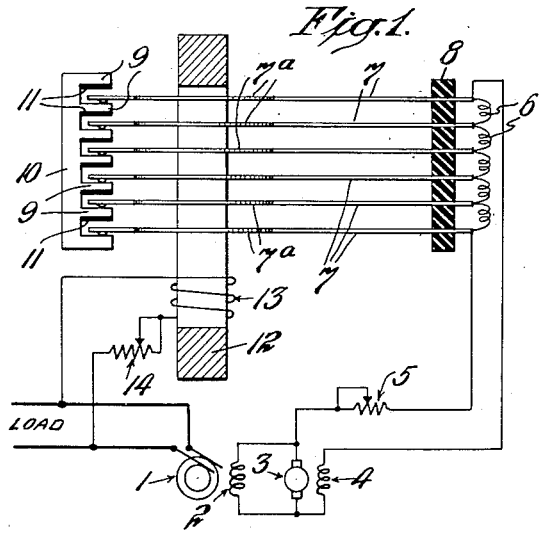
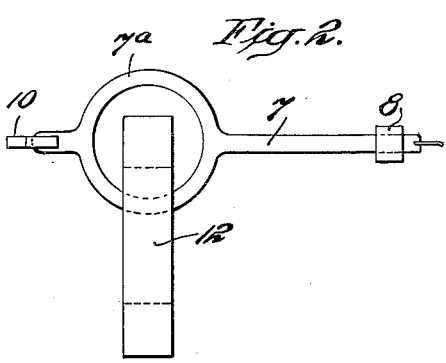
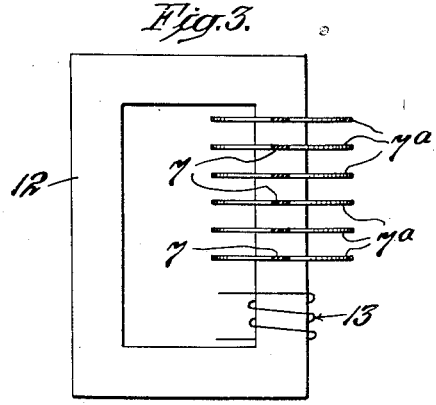
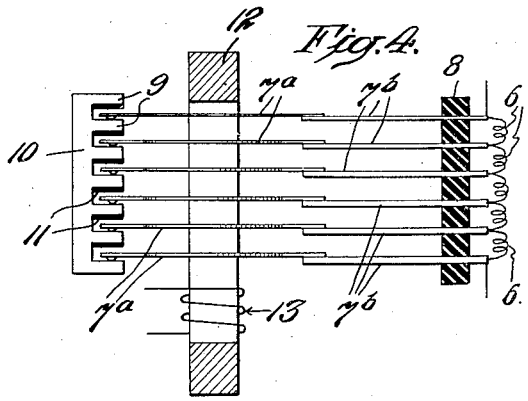
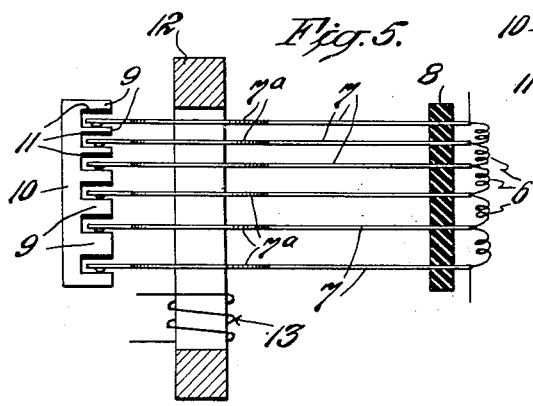
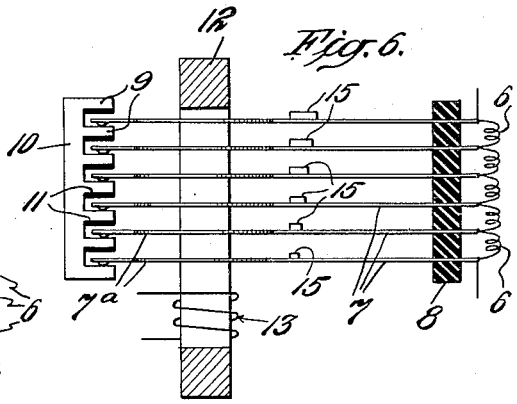
INVENTOR.
FRANK G. LOGAN
BY Lawrence K. Sager
his ATTORNEY March 12, 1946.  F. G. LOGAN  2,396,379
ELECTRIC CONTROLLING APPARATUS
Filed May 25, 1944  2 Sheets-Sheet 2
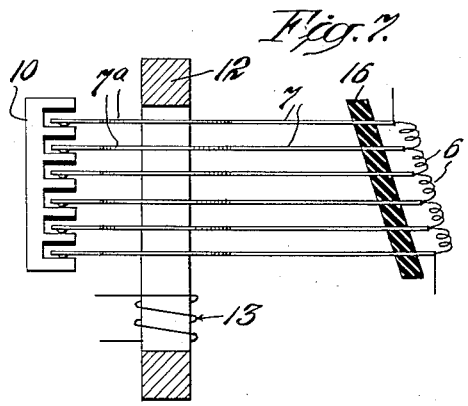
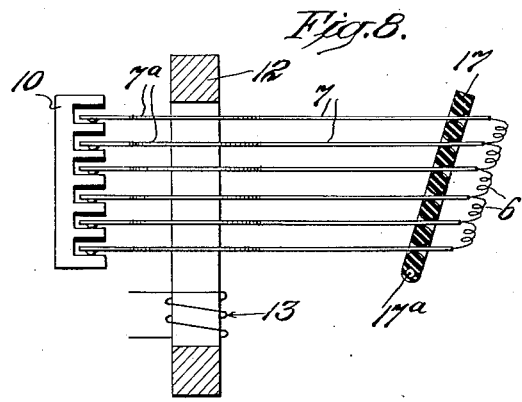
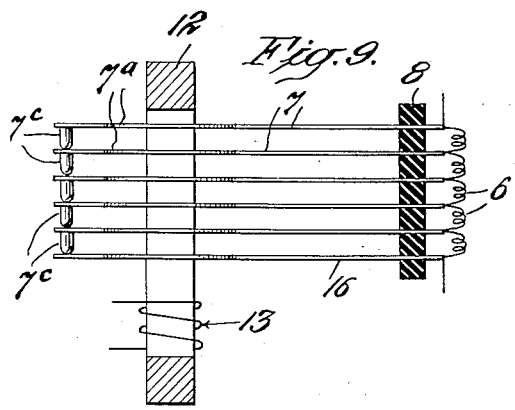
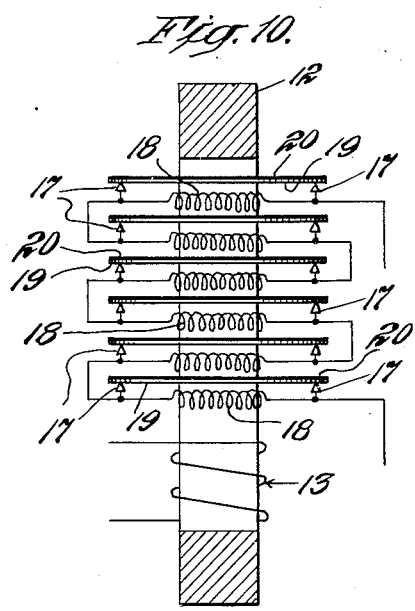
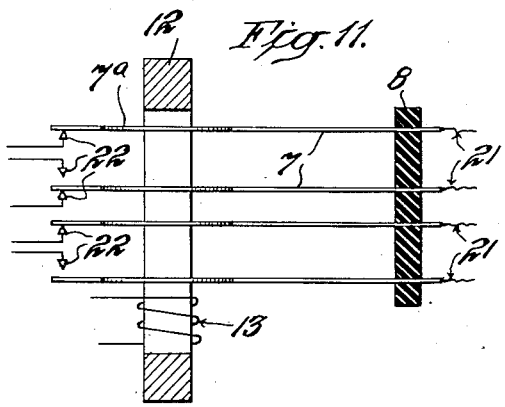
INVENTOR.
FRANK G. LOGAN
BY Lawrence K. Sager
his ATTORNEY Patented Mar. 12, 1946

2,396,379

UNITED STATES PATENT OFFICE 2,396,379

ELECTRIC CONTROLLING APPARATUS

Frank G. Logan, Mount Vernon, N. Y., assignor to Ward Leonard Electric Company, a corporation of New York Application May 25, 1944, Serial No. 537,279

12 Claims. (Cl. 201—48)

This invention relates particularly to electric regulators for controlling the voltage or other variable factor of an alternating current generator and is likewise applicable to other purposes where a variable current is utilized for securing a sequential control of portions of a circuit or of one or more circuits depending upon the strength of the controlling circuit.

The invention is based upon the fact that currents passing in opposite directions through two adjacent conductors will create a repelling force between the conductors; and also on the fact that a current induced in a conductor by a variable current in an adjacent conductor is in a direction opposite to the inducing current and thereby creates a repelling force between the two conductors. Also the magnitude of the force will depend upon the value of the induced current in its relation to the inducing current.

One object of the invention is to provide an improved regulator of a simple form wherein the actuated portions of the regulator serve directly to make and break the controlled contacts. This direct action results in producing a rapid response and controlling effect and reduces hunting to a minimum. Also it reduces the parts required and the cost of labor and material. Another object is to provide controlling means which will be dependable under long continued use and require a minimum amount of attention for maintenance. Another object is to produce controlling means which may be designed for any desired flexibility as to sensitivity of response and for adaptation to the particular requirements of control. A further object is to provide a character of control which may be made responsive between steps to any desired change in value of the controlling current, such as by proportional changes in the controlling current through successive steps, or in any desired manner of change through successive steps. Other objects and advantages will be understood from the following description and accompanying drawings illustrating various embodiments of the invention.

Fig. 1 is a diagram showing one form of regulator and controlling means; Fig. 2 is a top plan view of the controlling means of Fig. 1 as viewed from the right of Fig. 1; Fig. 3 is a front view of the parts shown in Fig. 2 and partly in section; Figs. 4 to 11 are front views, partly in section, of various forms of responsive controlling means for use in regulators or otherwise.

Fig. 1 shows an alternating current generator 1 having a separately excited field winding 2 which is energized by a direct current exciter having an armature 3 and a self-excited field winding 4. A manually adjustable rheostat 5 is shown in series with this winding and with an automatically variable resistive device 6 composed of a number of sections connected in series with each other and with intervening taps 7. Only a few of such resistive sections and taps are indicated for simplicity, but in practice a much greater number would ordinarily be used for obtaining refined control between steps of resistance.

The taps 7 are conductors in the form of leaf springs shown uniformly spaced from each other and supported near their right-hand ends by a fixed strip or block 8 of insulating material. The left-hand ends of the strips form contacts which respectively engage a series of projections or teeth 9 extending from a fixed body portion 10 of metal. The parts 9 and 10 have the general form of a comb. When the conducting springs 7 are all in engagement with the teeth as shown in Fig. 1, all sections of the variable resistive device 6 are short-circuited and the path of the field circuit is then from the upper terminal of the armature 3, through the rheostat 5, if used, thence to the lower spring 7, through the comb to the upper spring 7 and then through the field winding 4 to the lower terminal of the exciter armature. When the lower spring is raised to break its contact with the tooth 9, the lower section of the resistive device 6 is inserted in the field circuit; and similarly as each spring is raised successively, more and more of the resistive device 6 is included in the field circuit. The lower side of each tooth 9 is lined with insulation 11 against which the contact ends of the springs 7 will strike when raised and thereby serve as stops in addition to their insulating function. In some cases the top of the contact ends of the springs may be provided with insulation in place of insulating the lower faces of the teeth.

A rectangular core 12 is shown in Figs. 1, 2 and 3 of laminated iron or steel. Each of the springs 7 is provided, near the contact end, with an enlarged circular ring portion as particularly shown in Fig. 2 which embraces a vertical leg of the core; and the outer portion of each ring forms or carries the contact previously described. A winding 13 embraces the portion of the leg of the core below the rings 7a. This winding, as shown in Fig. 1, is connected across the line wires of the alternator 1 in series with an adjustable rheostat 14. The current in the winding 13 will, of course, be responsive to any change in voltage of the generator.

The winding 13 serves as the primary of a transforming device and the rings 7a serve as a series of secondaries spaced from each other in the form of circular conducting elements. The alternating magnetic flux induced in the core by the winding 13 will induce alternating currents in the rings 7a; and these induced currents will be substantially in the opposite direction to the inducing alternating current of the winding 13. It follows that a repelling force will be created between each of the rings 7a and the winding 13 tending to raise the springs from their contact engagement with the teeth of the comb. Furthermore, the strength of this force will depend upon the distance of each of the rings 7a from the winding and upon the leakage of flux in the core in relation to each of the rings 7a. It follows that when the current in the winding 13 is gradually increased the repelling force between the winding and the lower ring 7a will be sufficient to raise the lower spring from its contact engagement with its tooth which results in inserting the lower section, or resistive element, of the resistive device 6 in the field circuit of the exciter. However, the remaining rings 7a will not be affected appreciably owing to their greater distance from the winding 13 and also owing to the leakage of the core. But as the current in winding 13 is further increased, it attains a value sufficient to cause the second ring 7a to be raised by the repelling force and thereby insert the next resistive element of the resistive device 6 in the exciter field circuit. Similarly, further increases in current in the winding 13 will cause the remaining rings 7a to be successively raised until finally all of the resistive device 6 will be included in the field circuit of the exciter.

Now considering the regulating action of the circuits of Fig. 1, the generator voltage will be maintained approximately constant automatically. Under the regulating action, the rheostat 5 would ordinarily be moved to the resistance-all-out position and the automatic control be given full control of the field exciter current. Under the normal voltage of the generator, the current in the primary winding 13 would be adjusted by the rheostat 14 to cause the lower springs 7 to be raised from contact engagement with the comb 10. Upon any slight increase in voltage of the alternator above normal, the increased current in the winding 13 would cause one or more additional springs 7 to be raised and cause the insertion of one or more of the resistive sections 6 to be inserted in the field circuit of the exciter and thereby reduce the excitation of the field winding 2 of the main generator to decrease the low voltage to the normal amount. Upon any decrease of voltage of the generator below normal, the decreased current in the winding 13 would permit one or more of the springs 7 to contact the comb 10 and thereby short-circuit one or more sections of the resistive device 6 for strengthening the field of the exciter and thereby restore the voltage of the generator to its normal value.

In this controlling action, the supporting springs 7 serve to directly control individually the resistive sections of the exciter field circuit which gives a rapid corrective control of the voltage of the generator without the necessity of working through additional intermediate devices. Therefore any departure from normal of the generator voltage is rapidly counter-acted and the greater the departure the more pronounced is the corrective effect. This quick action tends to reduce hunting to a minimum. Also, the improvement enables the control to be made as highly sensitive as desired by the spacing of the rings 7a from each other, by adjustment of the tension of the springs, by design of the magnet as to the amount of leakage permitted and in various other ways. Where the controlling means is subjected to considerable change in temperature, the temperature coefficient of resistance of the rings 7a would affect the voltage of the generator and cause a drift in voltage unless the temperature coefficient of the conducting rings 7a be zero or of negligible amount. Therefore in order to overcome the effects of temperature changes, the rings 7a should have a low temperature coefficient of resistance, such as a copper nickel alloy. These rings and the springs 7 may be of the same low temperature coefficient metal provided sufficient spring tension is attained in the strips 7; or the springs could be made of material giving the proper spring tension and the conducting rings made of low temperature coefficient material and riveted, soldered, welded, or otherwise secured to the spring strips.

In some cases, it may be desirable to make the spring strips supporting the conducting rings of different material or of different thickness from each other in order to adapt their tension to a proper sequential operation in the automatic control of the resistive device 6 or other controlling means. In Fig. 4 the rings 7a are indicated as being secured to spring strips 7b of graduated thickness for this purpose. The difference in thickness of these strips 7b is exaggerated in Fig. 4 for the purpose of clearness. Likewise the rings 7a could be made of different thicknesses or different size in cross section in order to affect the sequential control because, disregarding other factors, the currents induced in the rings of larger cross section would be greater than those induced in rings of smaller cross section; and in the former case the repellent force created would be greater than in the latter case.

Fig. 5 shows a modification wherein the springs and conducting rings are variably spaced for affecting the sequential control by the increase or decrease of current in the winding 13. In Fig. 5 the spacing between the springs and conducting rings is comparatively large between the lower ones and gradually decreases towards the upper ones. Assuming other conditions to be the same, the structure of Fig. 5 will require a greater increase in the controlling current between steps of the lower springs and a less increase in current between steps of the upper springs for actuation thereof in comparison with the structure of Fig 1 wherein the springs are equally spaced.

Fig. 6 shows a structure wherein the springs 7 are differently weighted for affecting their response with change of current in the primary winding 13. Here each spring from the bottom upwards is provided with weights 15 of gradually increasing amounts and is equivalent to variably adjusting the spring tension of the springs, or variably spacing the springs for affecting their sensitivity.

Fig. 7 shows another modification wherein the springs 7 and conducting rings 7a are equally spaced but the sensitiveness of response is affected by inclining the fixed support 16 of the ends of the springs. Here the lower springs exert less force against the repellent action of the structure than the upper springs.

Fig. 8 is similar to Fig. 7 except that the fixed support for the springs is replaced by an adjustable support 17 pivoted at its lower end at 17a. Obviously the sensitivity of response as between different steps and the biased pressure imposed upon the contacts would be varied by adjusting the support 17 on its pivot; and if the support 17 were placed in a vertical position and then moved bodily to the right or to the left, the sensitivity of response of the springs would be uniformly affected.

Fig. 9 shows a modification similar to Fig. 1 except that the comb 10 having the projections 9 is eliminated and the contacts 7c outside the rings 7a are extended to directly engage adjoining ends of the spring members. The lower member 16 is fixed in position. As the current increases in the winding 13, the spring members would first be raised as a group causing the separation of the lower contact 7c from the element 16 inserting the first section of the resistive device 6. Further increase will cause the remaining elements to be raised as a group causing the next upper contact to separate from its engaged spring element inserting the next resistive section; and if the current in the winding 13 became sufficiently high, this successive operation would continue until all of the resistive device 6 became inserted in the controlled circuit. Therefore the controller would assume a condition according to the strength of the current in the primary winding and insert more or less of the resistive sections according to change in the current of the primary winding.

Fig. 10 shows a structure wherein the springs are eliminated and a series of pairs of oppositely disposed contacts 17 are arranged one above the other with a resistive section 18 connected between each pair of contacts and connected in series with each other in the circuit to be controlled. A conducting ring 19 corresponding to the rings 7a and encircling one leg of the core 12 rests upon each pair of contacts 17 and thereby short-circuits each section of resistance. These rings are movable upward from their contacts and are faced on the top with a layer 20 of insulating material. When the current in the winding 13 increases, the lower ring 19 would first be raised from its contacts, thereby inserting the intervening resistive section in the controlled circuit. Further increase of current in the primary winding would cause the next conducting ring 19 to move upwardly from its pair of contacts inserting the second section of resistance; and the number of resistive sections inserted in the controlled circuit would, of course, depend upon the value of the current in the primary winding, giving the controlling effect as described with reference to Fig. 1 or for any other desired purpose.

Fig. 11 shows a structure similar to that of Fig. 1 except the springs 7 are variably spaced and serve as conductors. Leads 21 are indicated as being connected to the springs at their fixed ends and the springs are adapted to engage fixed contacts 22 at their movable ends. In this manner the controller may be adapted to control circuits as desired according to the strength of current in the primary winding 13. The lower spring element 7 is shown out of engagement with its contact 22 but when the current in the control winding has attained a certain value, the lower spring will move to engage the contact 22 and thereby control the circuit to which it may be connected. A further increase in the controlling current will cause the next upper spring element to open its engagement with its contact 22 and thereby control its circuit. The next upper spring element is indicated as normally engaging a fixed contact but when the controlling current attains sufficient value, it will break the connection with that contact and engage the contact above it connected to another circuit. Thus the controller may be arranged to affect any desired control of circuits depending upon the strength of current in the controlling winding 13; and the distance at which the spring elements are spaced from the controlling winding may be utilized to determine the value of current in the controlling winding 13 which will cause actuation of the spring elements for the control of their respective circuits.

Although various embodiments of the invention have been shown and described, various modifications may be made for adaptation to particular requirements without departing from the scope of the invention.

I claim:

1. Electric controlling apparatus comprising a fixed core, a primary winding thereon for receiving a variable controlling current, a plurality of closed circuited secondary conducting elements encircling said core and variably movable on the core by the reactive force of the currents induced in said elements by the change of flux due to said primary winding, means for supporting said elements to be individually movable with reference to each other and spaced from each other at different distances from said primary winding, and controlling means variably adjusted by the variable movement of said elements in response to change of said controlling current.

2. Electric controlling apparatus comprising a fixed core, a primary winding thereon for receiving a variable controlling current, a plurality of closed circuited secondary conducting elements encircling said core and variably movable on the core by the reactive force of the currents induced in said elements by the change of flux due to said primary winding, means for supporting said elements to be individually movable with reference to each other and spaced from each other at different distances from said primary winding, and circuit connections controlled by the variable movement of said elements in response to change of said controlling current.

3. Electric controlling apparatus comprising a fixed core, a primary winding thereon for receiving a variable controlling current, a plurality of closed circuited secondary conducting elements encircling said core and variably movable on the core by the reactive force of the currents induced in said elements by the change of flux due to said primary winding, means for supporting said elements to be individually movable with reference to each other and spaced from each other at different distances from said primary winding, and a resistive device variably controlled by the variable movement of said elements in response to change of said controlling current.

4. Electric controlling apparatus comprising a fixed core, a primary winding thereon for receiving a variable controlling current, a plurality of closed circuited secondary conducting elements encircling said core and variably movable on the core by the reactive force of the currents induced in said elements by the change of flux due to said primary winding, means for supporting said elements to be individually movable with reference to each other and spaced from each other at different distances from said primary winding, a plurality of resistive elements, and contacting means controlled by the variable movement of said conducting elements for affecting the circuit connections of said resistive elements.

5. Electric controlling apparatus comprising a fixed core, a primary winding thereon for receiving a variable controlling current, a plurality of closed circuited secondary conducting elements encircling said core and variably movable on the core by the reactive force of the currents induced in said elements by the change of flux due to said primary winding, means for supporting said elements to be individually movable with reference to each other and spaced from each other at different distances from said primary winding, and a plurality of resistive elements, said conducting elements having contacting parts carried thereby biased in one direction of movement and variably affecting the circuit connections of said resistive elements by said variable movement in a direction against said biased direction.

6. Electric controlling apparatus comprising a fixed core, a primary winding thereon for receiving a variable controlling current, a plurality of closed circuited secondary conducting elements encircling said core and variably movable on the core by the reactive force of the currents induced in said elements by the change of flux due to said primary winding, means for supporting said elements to be individually movable with reference to each other and spaced from each other at different distances from said primary winding, and a plurality of resistive elements, said conducting elements having contacting parts carried thereby biased in one direction of movement for short-circuiting said resistive elements and variably affecting the circuit connections of said resistive elements by said variable movement in a direction against said biased direction.

7. Electric controlling apparatus comprising a fixed core, a primary winding thereon for receiving a variable controlling current, a plurality of closed circuited secondary conducting elements encircling said core and variably movable on the core by the reactive force of the currents induced in said elements by the change of flux due to said primary winding, means for supporting said elements to be individually movable with reference to each other and spaced from each other at different distances from said primary winding, a plurality of resistive elements, and a fixed conducting element, said secondary conducting elements having contacting parts carried thereby biased to engage said fixed element in one direction of movement for short-circuiting said resistive elements and variably affecting the circuit connections of said resistive elements by said variable movement in a direction against said biased direction.

8. Electric controlling apparatus comprising a fixed core, a primary winding thereon for receiving a variable controlling current, a plurality of closed circuited secondary conducting elements encircling said core and variably movable on the core by the reactive force of the currents induced in said elements by the change of flux due to said primary winding, means for supporting said elements to be individually movable with reference to each other and spaced at different distances from each other and at different distances from said primary winding, and circuit connections controlled by the variable movement of said elements in response to change of said controlling current.

9. Electric controlling apparatus comprising a fixed core, a primary winding thereon for receiving a variable controlling current, a plurality of closed circuited secondary conducting elements encircling said core and variably movable on the core by the reactive force of the currents induced in said elements by the change of flux due to said primary winding, means for yieldably supporting said elements to be individually movable with reference to each other and spaced from each other at different distances from said primary winding, and circuit connections controlled by the variable movement of said elements in response to change of said controlling current.

10. Electric controlling apparatus comprising a fixed core, a primary winding thereon for receiving a variable controlling current, a plurality of closed circuited secondary conducting elements encircling said core spaced from each other at different distances from said primary winding and variably movable on the core by the reactive force of the currents induced in said elements by the change of flux due to said primary winding, means for yieldably supporting said elements to be individually movable with reference to each other and for biasing said elements to certain positions, and circuit connections controlled by the variable movement of said elements in response to change of said controlling current.

11. Electric controlling apparatus comprising a fixed core, a primary winding thereon for receiving a variable controlling current, a plurality of closed circuited secondary conducting elements encircling said core spaced from each other at different distances from said primary winding and variably movable on the core by the reactive force of the currents induced in said elements by the change of flux due to said primary winding, means for yieldably supporting said elements to be individually movable with reference to each other and for biasing said elements to certain positions under different pressures, and circuit connections controlled by the variable movement of said elements in response to change of said controlling current.

12. Electric controlling apparatus comprising a fixed core, a primary winding thereon for receiving a variable controlling current, a plurality of closed circuited secondary conducting elements encircling said core spaced from each other at different distances from said primary winding and variably movable on the core by the reactive force of the currents induced in said elements by the change of flux due to said primary winding, means for yieldably supporting said elements to be individually movable with reference to each other and for biasing said elements to certain positions, means whereby the pressure exerted by said yieldable means may be adjusted, and circuit connections controlled by the variable movement of said elements in response to change of said controlling current.

FRANK G. LOGAN.